Figure 2:
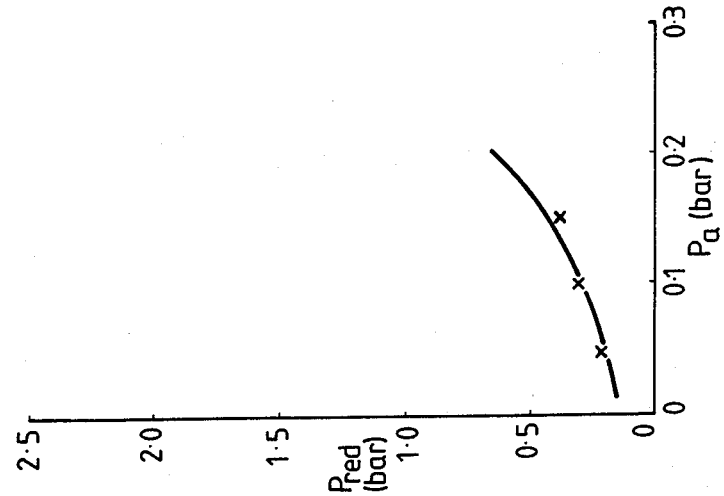

United States Patent [19]

Browne et al.

[11] Patent Number: 4,903,573

[45] Date of Patent: Feb. 27, 1990

[54] EXPLOSION SUPPRESSION SYSTEM AND COMPOSITION FOR USE THEREIN

[75] Inventors: John W. Browne, Chester; Anthony Naylor, Northwich; Henry Ratter, Upton, all of United Kingdom

[73] Assignee: Imperial Chemical Industries PLC, London, England

[21] Appl. No.: 164,775

[22] Filed: Mar. 4, 1988

[30] Foreign Application Priority Data

Mar. 11, 1987 [GB] United Kingdom ............ 8705803

[51] Int. Cl.$^4$ .................. F42B 33/00; F42D 5/00; A62C 37/06

[52] U.S. Cl. .................................. 86/50; 252/2; 252/602; 252/3; 102/303; 109/26; 169/20; 426/133; 137/81.1

[58] Field of Search ............... 86/50; 102/303, 305; 89/36.01, 36.17; 109/49.5, 26; 426/133; 169/20, 8, 28; 137/81.1

[56] References Cited

U.S. PATENT DOCUMENTS

| | | | |
|---|---|---|---|
| 2,340,945 | 2/1944 | Ellick | 86/50 |
| 2,631,977 | 3/1953 | Allen et al. | 252/7 |
| 4,267,889 | 5/1981 | Williams | 86/50 |
| 4,543,872 | 10/1985 | Graham | 86/50 |
| 4,589,341 | 5/1986 | Clark et al. | 102/303 |
| 4,702,322 | 10/1987 | Richardson | 169/28 |
| 4,722,766 | 2/1988 | Spring | 252/2 |

FOREIGN PATENT DOCUMENTS

| | | |
|---|---|---|
| 1098367 | 1/1961 | Fed. Rep. of Germany . |
| 1156655 | 10/1963 | Fed. Rep. of Germany . |
| 1161146 | 1/1964 | Fed. Rep. of Germany . |
| 2454603 | 5/1976 | Fed. Rep. of Germany . |
| 1203536 | 1/1960 | France . |
| 1361597 | 4/1964 | France . |
| 1240733 | 7/1971 | United Kingdom . |
| 2022409 | 12/1979 | United Kingdom . |
| 2138285 | 10/1984 | United Kingdom . |

OTHER PUBLICATIONS

Chemical Abstracts, vol. 86, No. 18, p. 118, abstract 123401q.

Chemie Ingeniens Technik, vol. 51, No. 1, Jan. 1979, pp. 8–14.

Primary Examiner—Howard J. Locker
Attorney, Agent, or Firm—Cushman, Darby & Cushman

[57] ABSTRACT

A composition, suitable for use as an explosion suppression composition, and comprising a mixture of at least one particulate component selected from alkali metal bicarbonate, alkali metal sesquicarbonate, and alkali metal carbonate, and a free-flow additive in particulate form. Also, a discharge apparatus comprising a vessel containing the composition under pressure, and an explosion suppression system comprising a pressure change detector operatively connected to a discharge vessel.

7 Claims, 1 Drawing Sheet

EXPLOSION SUPPRESSION SYSTEM AND COMPOSITION FOR USE THEREIN

This invention relates to an explosion suppression system and to a composition for use in such a system, and especially to a particulate solid composition for use in such a system.

Explosible compositions are well-known, as are the hazards associated with the handling of such compositions. Examples of explosible compositions include a composition which comprises a flammable gas, or a composition which comprises the vapour of a flammable liquid, or a composition which comprises a dust of a flammable solid material. Such compositions present a substantial hazard when stored, handled or processed, particularly when there is a danger of such a composition being ignited, for example by the generation of an incendive spark, e.g. as a result of the presence of static electricity in equipment in which the composition is stored, handled or processed.

Specific examples of such explosible compositions include hydrocarbon gases, e.g. when contained in a storage tank under elevated pressure, the vapour associated with gasoline, particularly the vapour associated with gasoline in a storage tank, and the fine dust formed from such solid materials as sugar, starch, grain, e.g. maize, wheat and barley, and dried milk. Such fine dust may be present in storage vessels, or in processing equipment such as filters, grinders, elevators, and driers, for example in a spray drier.

There are basically two methods of dealing with the hazards associated with such explosible compositions. Firstly, where there is a risk that such an explosible composition may be ignited in such equipment the equipment may contain suitable explosion vents such that any explosion is channelled out of the equipment and into the environment. Although the use of such explosion vents may save the equipment from severe damage, or even catastrophic damage, there will generally be some damage to the equipment following an explosion. What is more important, however, and what places a limitation on the use of such explosion vents, is that the environment surrounding the equipment may be quite unsuited to receive the results of such an explosion. Thus, the equipment may be surrounded by or be adjacent to other flammable material, or equipment containing flammable material, and furthermore, and most importantly, there may be a substantial risk to people by the use of such vents.

An alternative method of dealing with the hazard associated with such explosible compositions is to suppress any deflagrating explosion which may take place. Thus, the equipment in which such an explosible composition is likely to be formed may be protected by means of an explosion suppression system. An explosion suppression system comprises a detector for detecting a change in pressure which occurs in an item of equipment, such as may occur in the initial stage of an explosion, and a discharge apparatus from which an explosion suppression composition may be discharged into the equipment. The detector and the discharge apparatus are both installed in the equipment and they are operatively connected so that when a predetermined change in pressure in the equipment is detected by the detector a command is passed to the discharge apparatus and an appropriate explosion suppression composition is discharged into the equipment in order to suppress the explosion. Such explosion suppression systems are very widely used in industry.

The composition which is discharged from the discharge apparatus may be a liquid composition, e.g. water, or it may be a solid, particulate composition, and it is with compositions of this latter type that the present invention is concerned. A favoured composition currently in use is ammonium dihydrogen phosphate in particulate form.

Although particulate ammonium dihydrogen phosphate is effective in suppressing explosions of flammable gases and vapours, and of flammable dusts, it does suffer from a drawback in that after being discharged in order to suppress an explosion it inevitably contaminates the material which is present in the equipment. This material may be intended for human consumption, for example it may be grain, sugar, starch or dried milk, and such a material which is contaminated with ammonium dihydrogen phosphate is no longer fit for human consumption, with the result that the contaminated material must often be destroyed.

The present invention relates to a composition which is effective in suppressing explosions but which is less liable than is ammonium dihydrogen phosphate to render unfit for human consumption the material with which it may come into contact, and in a preferred form the composition does not render the material with which it may come into contact unfit for human consumption. Furthermore, the composition, or at least a very major proportion of the composition, is water-soluble and it is thus possible to clean very readily an item of equipment into which the composition has been discharged.

The present invention provides a composition, suitable for use as an explosion suppression composition, and comprising a mixture of at least one particulate component selected from alkali metal bicarbonate, alkali metal sesquicarbonate, and alkali metal carbonate, and a free-flow additive in particulate form.

The invention also provides a discharge apparatus which comprises a vessel containing a composition, suitable for use as an explosion suppression composition, and which comprises at least one particulate component selected from alkali metal bicarbonate, alkali metal sesquicarbonate, and alkali metal carbonate the composition optionally also comprising a particulate free-flow additive, and the composition in the vessel being pressurised, for example by means of a non-flammable gas e.g. nitrogen.

In a further embodiment of the invention there is provided an explosion suppression system which comprises a detector for detecting a change in pressure which is operatively connected to a discharge apparatus as herein described.

The explosion suppression system may be fitted to an item of equipment in which a potentially explosive composition may be contained, and the item of equipment may be fitted with several detectors and several discharge apparatuses, each detector being operatively connected to a discharge apparatus. In this embodiment of the invention each discharge apparatus is operatively connected to a detector, and a detector may be operatively connected to one, or more than one, discharge apparatus.

A benefit provided by the present invention resides in the fact that alkali metal bicarbonates, alkali metal sesquicarbonates, and alkali metal carbonates, or mixtures thereof, used as or as part of the explosion suppression composition are less liable than ammonium dihydrogen phosphate to render unfit for human consumption the material with which the composition may come into contact. Alkali metal bicarbonates are somewhat less alkaline than the corresponding sesquicarbonates and carbonates and for this reason alkali metal bicarbonates are preferred. Indeed, alkali metal bicarbonates may be consumed in substantial quantities by human beings and thus any material such as grain, sugar, starch or dried milk, which becomes contaminated with such a bicarbonate is not itself rendered unfit for human consumption and thus it is not necessary to destroy such a material.

As the sodium salts are the most readily available it is preferred that the composition comprises at least one particulate component selected from sodium bicarbonate, sodium sesquicarbonate, and sodium carbonate, and the invention will be described hereafter with reference to such sodium salts.

It is important that the composition should not agglomerate in the discharge apparatus and that it should have good throw characteristics when discharged from the discharge apparatus, and the particle size of the composition should be chosen to achieve good throw characteristics. The particle size of the composition may be chosen in order to achieve particularly desirable throw characteristics, and for this reason it is preferred that the particles of sodium bicarbonate, sesquicarbonate or carbonate have a particle size of less than 100 microns more preferably less than 50 microns. A particularly preferred particle size is a size of less than 30 microns. In general the particles will have a size of greater than 1 micron.

In order to assist in the provision of good throw characteristics, and in order to assist in the prevention of agglomeration of the particles in the composition in the discharge apparatus, the composition preferably contains a free-flow additive admixed with a sodium bicarbonate, sesquicarbonate, or carbonate. Such free-flow additives are knowing the art, and suitable examples include synthetic silica and tricalcium phosphate. The composition may suitably contain up to 2%, preferably up to 1%, of such free-flow additive by weight of the composition.

A preferred composition comprises a component which on decomposition yields a product which is capable of inhibiting flame propagation, and for this reason it is preferred that the composition contains sodium bicarbonate or sodium sesquicarbonate which yield water and carbon dioxide on decomposition. However, the preferred composition contains sodium bicarbonate as sodium bicarbonate may be tolerated in substantial amounts by human beings.

The discharge apparatus is pressurised such that on activation on a command being received from the pressure change detector the composition in the discharge apparatus is rapidly and completely discharged. The discharge apparatus is suitably pressurised by nitrogen or by an inert gas. The discharge apparatus may have a size such as to contain, for example, at least 2 Kg of composition. It may have a size such as to contain substantially more than 2 Kg of composition, e.g. up to 40 Kg of composition.

The explosion suppression system may comprise any suitable detector for detecting a change in pressure which takes place in the initial stages of an explosion. The detector may be, for example, a transducer, and the operative connection to the discharge apparatus may be an electrical connection. The electrical current generated by the effect of change of pressure on the detector, e.g. on the transducer, may serve to command the discharge apparatus to discharge the composition.

The detector may be set to operate at any predetermined change in pressure, for example, at a change of pressure of 0.1 bar, or 0.2 bar, in the equipment in which the explosion suppression system is installed.

The explosion suppression system should be suitably positioned in the equipment which is to be protected by the system. Thus, several discharge apparatuses, and one or more detectors for detecting a change of pressure and operatively connected thereto, may be positioned about the equipment so that on discharge of the composition from the apparatuses the composition is well distributed in the equipment.

The invention is illustrated by the following examples.

The explosion suppression experiments were carried out in a pressure vessel of cylindrical shape which was fitted with one discharge apparatus filled with a particulate explosion suppression composition pressurised with nitrogen, a pressure detector operatively connected to the discharge apparatus, a pressure measuring device which was used to measure the maximum pressure generated on explosion, means for injecting an explosive composition into the vessel, and an igniter positioned at the geometric centre of the vessel.

EXAMPLE 1

In two control experiments the maximum pressure generated in the pressure vessel on ignition of a mixture of propane gas and air containing 4.5% by volume of propane gas in air was measured. The maximum pressure P max which was generated in these experiments was 7.4 bar and 7.9 bar respectively.

Figure 1:
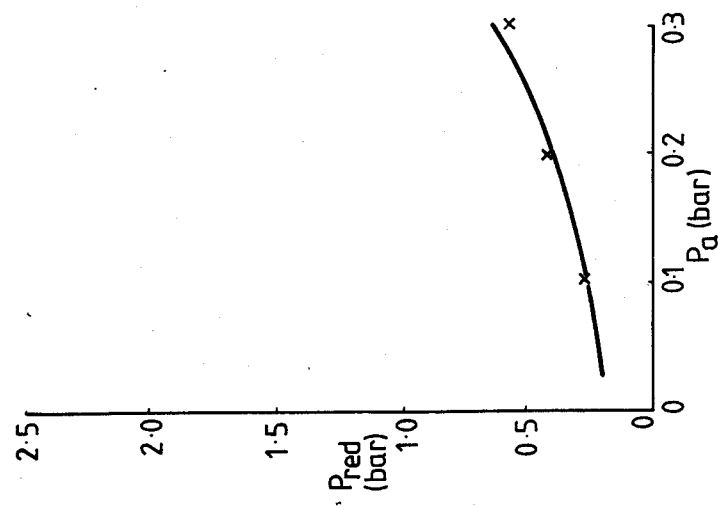

In a series of separate experiments the maximum pressure generated on ignition of the mixture of propane gas and air was determined when the explosion was suppressed by the discharge into the apparatus of 16 Kg of a composition comprising particulate sodium bicarbonate having a particle size of about 25 microns and 1.0 weight percent of synthetically produced silica free-flow additive. In these experiments the maximum pressure generated was reduced due to discharge of the composition. In the accompanying graph, FIG. 1, this reduced pressure, P red, is plotted as a function of the pressure, Pa. at which the pressure detector became activated and the composition was discharged.

EXAMPLE 2

The procedure of Example 1 was repeated except that the explosible composition in the pressure vessel was maize dust in an amount of 0.5 Kg m$^{-3}$. In this case the maximum pressure Pmax which was generated on ignition in two control experiments was 8.6 bar and 8.8 bar respectively. The results of the explosion suppression experiments are given in FIG. 2.

We claim:

1. An explosion suppression system which comprises a detector for detecting a change in pressure operatively connected to a discharge apparatus which includes a vessel containing a composition, suitable for use as an explosion suppression composition, said composition comprising at least one particulate component selected from alkali metal bicarbonate, alkali metal sesquicarbonate, and alkali metal carbonate, and a free-flow additive, said composition being such that it does not render unfit for human consumption food material which it may come in contact with.

2. An explosion suppression system according to claim 1 which comprises a vessel which contains material intended for human consumption, said vessel being fitted with at least one detector for detecting a change of pressure in the vessel and at least one discharge apparatus which contains an explosion suppressing composition which comprises at least one particulate component selected from the group consisting of alkali metal bicarbonate, alkali metal carbonate, and alkali metal sesquicarbonate, the composition in the discharge apparatus being pressurized and the discharge apparatus being operatively connected to the detector and the vessel so that when a predetermined change in the pressure in the vessel is detected by said detector, said composition is discharged into said vessel to suppress explosion.

3. A system as claimed in claim 2 in which the particulate component comprises alkali metal bicarbonate.

4. A system as claimed in claim 3 in which the particulate component has a particle size of less than 100 microns.

5. A system as claimed in claim 4 in which the composition contains up to 2% of free-flow additive by weight of the composition.

6. A system as claimed in claim 5 in which said vessel is operatively connected to a plurality of discharge apparatuses.

7. A system as claimed in claim 6 in which the vessel contains sugar, starch, grain or dried milk.

* * * * *